(12) United States Patent
Jerabek et al.

(10) Patent No.: US 6,201,685 B1
(45) Date of Patent: Mar. 13, 2001

(54) ULTRACAPACITOR CURRENT COLLECTOR

(75) Inventors: Elihu Calfin Jerabek, Glenmont, NY (US); Mati Mikkor, Ann Arbor, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/166,252

(22) Filed: Oct. 5, 1998

(51) Int. Cl.[7] .................. H01G 9/00; H01G 9/02
(52) U.S. Cl. .................. 361/502; 29/25.03; 361/512
(58) Field of Search .................. 361/502, 503, 361/504, 508–509, 516, 523, 525, 528, 530; 29/25.03; 156/182; 204/291–294; 252/62.2

(56) References Cited

U.S. PATENT DOCUMENTS

| | | |
|---|---|---|
| 3,997,339 | 12/1976 | Fickelscher . |
| 4,510,207 | 4/1985 | Mehada et al. . |
| 4,803,597 | 2/1989 | Watanabe et al. . |
| 5,128,836 | 7/1992 | Fukuoka et al. . |
| 5,136,472 | 8/1992 | Tsuchiya et al. . |
| 5,150,283 | 9/1992 | Yoshida et al. . |
| 5,417,839 | 5/1995 | Sakaguchi et al. . |
| 5,420,747 | 5/1995 | Ivanov et al. . |
| 5,464,453 | 11/1995 | Tong et al. . |
| 5,518,823 | 5/1996 | Fujihira et al. . |
| 5,525,656 | 6/1996 | Heiling et al. . |
| 5,599,404 * | 2/1997 | Alger .................. 148/212 |
| 5,621,607 * | 4/1997 | Farahmandi et al. .......... 361/502 |
| 5,726,856 * | 3/1998 | King, Jr. et al. .......... 361/505 |
| 5,777,428 * | 7/1998 | Farahmandi et al. .......... 313/352 |

FOREIGN PATENT DOCUMENTS 11486  4/1996 (WO) .

OTHER PUBLICATIONS

"Mobility and Ionic Association of Lithium Salts in a Propylene Carbonate–Ethyl Methyl Carbonate Mixed Solvent", Ue & Mori, Electrochem. Soc., vol. 142, No. 8, Aug. 1995.

* cited by examiner

*Primary Examiner*—Anthony Dinkins
(74) *Attorney, Agent, or Firm*—Noreen C. Johnson; Douglas E. Stoner

(57) ABSTRACT

An ultracapacitor having two solid, nonporous current collectors, two porous electrodes separating the collectors, a porous separator between the electrodes and an electrolyte occupying the pores in the electrodes and separator. At least one of the current collectors comprises a conductive metal substrate coated with a metal nitride, carbide or boride coating.

17 Claims, 3 Drawing Sheets

ULTRACAPACITOR CURRENT COLLECTOR

This invention was made with government support under Contract No. 38-83CH10093 awarded by DOE. The government may have certain rights in the invention.

BACKGROUND OF THE INVENTION

Capacitors are storage devices that store electrical energy on an electrode surface. Electrochemical cells create an electrical charge at electrodes by chemical reaction. The ability to store or create electrical charge is a function of electrode surface area in both applications. Ultracapacitors, sometimes referred to as double layer capacitors, are a third type of storage device. An ultracapacitor creates and stores energy by microscopic charge separation at an electrical chemical interface between electrode and electrolyte.

Ultracapacitors are able to store more energy per weight than traditional capacitors and they typically deliver the energy at a higher power rating than many rechargeable batteries. Ultracapacitors comprise two porous electrodes that are isolated from electrical contact by a porous separator. The separator and the electrodes are impregnated with an electrolytic solution, which allows ionic current to flow between the electrodes while preventing electronic current from discharging the cell. Each electrode is in intimate contact with a current collector. One purpose of the current collector is to reduce ohmic loss. If the current collectors are nonporous, they can also be used as part of the capacitor case and seal.

When electric potential is applied to an ultracapacitor cell, ionic current flows due to the attraction of anions to the positive electrode and cations to the negative electrode. Upon reaching the electrode surface, the ionic charge accumulates to create a layer at the solid liquid interface region. This is accomplished by absorption of the charge species themselves and by realignment of dipoles of the solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the ultracapacitor electrodes causes ionic current to flow as anions are discharged from the surface of the positive electrode and cations are discharged from the surface of the negative electrode while an electronic current flows through an external circuit between electrode current collectors.

In summary, the ultracapacitor stores energy by separation of positive and negative charges at the interface between electrode and electrolyte. An electrical double layer at this location consists of sorbed ions on the electrode as well as solvated ions. Proximity between the electrodes and solvated ions is limited by a separation sheath to create positive and negative charges separated by a distance which produces a true capacitance in the electrical sense.

During use, an ultracapacitor cell is discharged by connecting the electrical connectors to an electrical device such as a portable radio, an electric motor, light emitting diode or other electrical device. The ultracapacitor is not a primary cell but can be recharged. The process of charging and discharging may be repeated over and over. For example, after discharging an ultracapacitor by powering an electrical device, the ultracapacitor can be recharged by supplying potential to the connectors.

The physical processes involved in energy storage in an ultracapacitor are distinctly different from the electrochemical oxidation/reduction processes responsible for charge storage in batteries. Further unlike parallel plate capacitors, ultracapacitors store charge at an atomic level between electrode and electrolyte. The double layer charge storage mechanism of an ultracapacitor is highly efficient and can produce high specific capacitance, up to several hundred Farads per cubic centimeter.

The factors to be considered in choosing a current collector for an ultracapacitor include electrical conductivity, chemical stability to electrolyte and contaminants and low electrical resistance throughout the life of the device. A current collector has two components of resistance; a material electronic resistance and a contact resistance at the electrode interface. Since the contact resistance can be significantly larger than the material electronic resistance, treatments to reduce contact resistance or enlarge contact area between the current collector and electrode are important. Surface etching and other roughening procedures can be used to enlarge contact area. However, the permanence of a treated current collector is an issue in device longevity since the surface of a collector can become chemically transformed, as with an oxide or can react with electrode or electrolyte to form a barrier layer.

Several types of materials are commonly used as current collectors in double layer ultracapacitors. Precious metals, such as platinum and gold are suitable although gold can be oxidized under certain conditions. Cost considerations exclude the precious metals from development. Conductive polymer materials such as polyethylene and Kapton® films loaded with 20–40 weight % carbon black show high resistance relative to metal films, but can be used if current flow is along the z axis, or thickness, of the film. However for current collection and conduction out of one or more cells in series, the polymer materials are unsuitable due to high resistance in the x-y plane. Additionally, conductive polyethylene and conductive Kapton® are slightly permeable to electrolyte, which diffuses through the polymer current collector with time. This effect is aggravated over time by high cell voltage and high temperature and is especially prominent on a cathode side of a cell. Further, Kapton® swells in common propylene carbonate ("PC") and γ-butyrolactone ("GBL") electrolyte solvents and may cause other mechanical defects.

Current collectors commonly are made of aluminum because of its conductivity and cost. However, contact resistance is a critical factor with aluminum. Aluminum contact resistance arises from aluminum's superb ability to form a highly insulating oxide coating. Initially, a native oxide coating is easily breached by mechanical penetration of carbon particles during cell fabrication. Thus, aluminum collectors show low resistance when an ultracapacitor is first sealed. However with time and applied voltage, resistance can increase by an order of magnitude or more. This rise is caused by increased contact resistance and prohibits all but very low power operation. A mechanism postulated for this resistance increase is that mechanical action of the carbon particles at the aluminum interface breach the oxide coating and allow fresh aluminum to be oxidized beneath the particles. This results in a thickening of the oxide under each carbon/aluminum interface.

The present invention relates to a conductive and adherent coating for aluminum that prevents formation and thickening of the highly resistive aluminum oxide layer in a nonaqueous ultracapacitor.

SUMMARY OF THE INVENTION

The ultracapacitor of the invention comprises two solid, nonporous current collectors, two porous electrodes separating the collectors, a porous separator between the electrodes and an electrolyte occupying the pores in the electrodes and separator. At least one of the current collectors comprises a conductive metal substrate coated with a metal nitride, carbide or boride coating.

The invention also relates to a method of making an ultracapacitor. The method comprises providing a multilayer structure comprising two solid, nonporous current collectors, two porous electrodes separating the current collectors, a porous separator between the electrodes and an electrolyte occupying the pores in the electrodes and separator. At least one of the current collectors is a conductive aluminum layer coated with a metal nitride, carbide or boride coating. The multilayer structure is sealed to form the ultracapacitor.

DETAILED DESCRIPTION OF THE INVENTION

Figure 1:
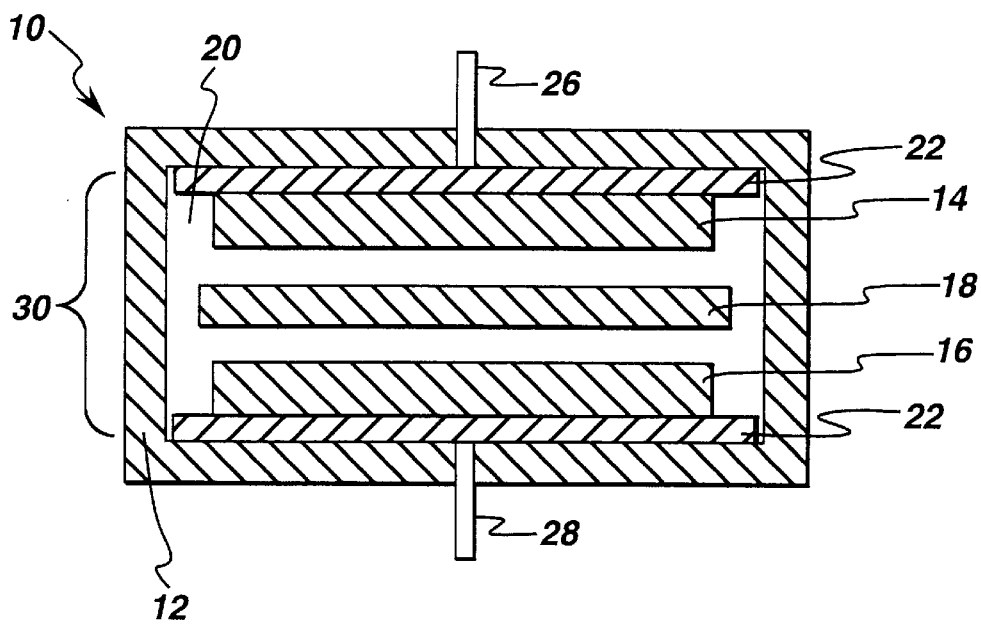
FIG. 1 is a front sectional view of an ultracapacitor.
Figure 2:
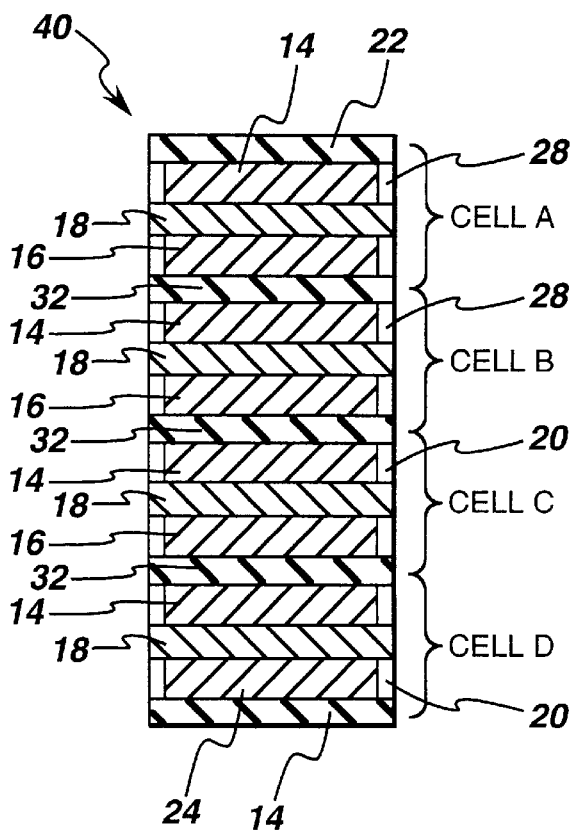
FIG. 2 is a front sectional view of a series stack of ultracapacitor cells.

The current collector of the invention may be used in a wide variety of ultracapacitors such as described in U.S. Pat. Nos. 5,464,453; 5,420,747; 5,150,283; 5,136,472; and 4,803,597; as well as PCT Application WO96/11486 (PCT/US95/12772; Apr. 18, 1996), all of which are incorporated herein by reference. FIGS. 1 and 2 herein, are based on PCT Application WO 96/11486 and show a non-limiting example of an ultracapacitor made by the method of the present invention.

In all of the Figures of this application, like structures are identified by the same numbers.

Referring to FIG. 1, ultracapacitor 10 includes a nonconductive enclosing body 12, a pair of carbon electrodes 14 and 16, an electronic porous separator layer 18, an electrolyte 20, a pair of conductive layers which are current collectors 22 and 24 and electrical leads 26 and 28, extending from the current collectors 22 and 24. One of the pair of current collectors 22 and 24 is attached to the back of each electrode 14 and 16. In FIG. 1, electrodes 14 and 16 can each represent a plurality of electrodes so long as the electrodes are porous to electrolyte flow.

The current collectors 22 and 24 are thin layers of titanium nitride (TiN) coated aluminum foil according to the present invention. The coating is preferably hermetic in coverage and stoichiometric in composition. A 1:1 stoichiometry is the most conductive state of TiN. The coating possesses good chemical and electrochemical stability to cell electrolyte. The coating functions as an electrical contact for carbon particles. The coating maintains a low resistance electrical path to the aluminum substrate even if some unprotected areas in the aluminum substrate such as pinholes, experience continued growth of oxide layer.

Although titanium nitride is a preferred coating material, any chemically inert material which is adherent to the metal substrate and retains good conductivity can be used. In general, the nitrides, carbides and borides of metals are conductive and are chemically stable in the nonaqueous ultracapacitor environment. Examples of such materials are nitrides, carbides and borides of the refractory metals, which include Ti, Zr, Hf, V, Nb, Ta, Cr, Mo, W, Th, and U. Additionally, nitrides, carbides or borides of some other metals may satisfy the above criteria.

Although aluminum is the preferred metal current collector substrate for coating, other oxidizable metals can be used if hermetically coatable with a protective, conductive, and stable coating. Examples include copper and steel with a protective coating. Further, nitride, carbide and boride coatings of the refractory metals, and others, can function as the current collector of a nonaqueous ultracapacitor. Examples of preferred metals and coatings include aluminum coated with TiN and titanium with a nitrided surface.

The metal foil or sheet can be coated by any one of exemplary coating processes. For example, titanium nitride coatings can be made by reactive sputter deposition on the aluminum in vacuum. Other coating processes which can be used are conventional sputter deposition, reactive evaporation, molecular beam deposition and any of a host of other plasma or energy-enhanced deposition processes in vacuum. Plasma spraying in inert atmosphere has also been used to make TiN and other coatings on metal substrates. Thin coatings can also be formed by direct chemical reaction at the surface of the current collector metal in a suitable reactor and environment.

Again referring to FIG. 1, an electronic separator 18 is placed between the opposing carbon electrodes 14 and 16. The electronic separator 18 is preferably made from a highly porous material which acts as an electronic insulator between the carbon electrodes 14 and 16. The separator 18 assures that opposing electrodes 14 and 16 are never in contact with one another. Contact between electrodes could result in a short circuit and rapid depletion of the charges stored in the electrodes. The porous nature of the separator 18 allows movement of ions in the electrolyte 20. A wide variety of types and arrangements of separation layers can be employed, as those of ordinary skill in the electrochemical arts realize. Separation layers are usually made from nonconductive materials such as cellulosic materials; glass fiber; polymers such as polyesters or polyolefins; and the like. In those embodiments in which the separator layers will be in contact with sealant material, they should have a porosity sufficient to permit the passage of sealant and should be resistant to the chemical components in the sealant. In a typical ultracapacitor, the separator layers have a thickness in the range of about 0.5 mil to about 10 mils. Preferred separators 18 are porous polypropylene and tissue cellulosic materials.

Exemplary organic solvents for electrolyte 20 include but are not limited to nitrites such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. Preferably, the electrolyte includes a polar aprotic organic solvent such as a cyclic ester, chain carbonate, cyclic carbonate, chain ether and/or cyclic ether solvent and a salt. Preferred cyclic esters are esters having 3 to 8 carbon atoms. Examples of the cyclic esters include β-butyrolactone, γ-butyrolactone, γ-valerolactone and 67-valerolactone. The chain carbonates are preferred to be carbonates having 3 to 8 carbon atoms. Examples of the chain carbonates include dimethyl carbonate, diethyl carbonate, dipropyl carbonate, methyl ethyl carbonate, methyl propyl carbonate and ethyl propyl carbonate. The preferred cyclic carbonates have 5 to 8 carbon atoms. Examples of the cyclic carbonates include 1,2-butylene carbonate, 2,3-butylene carbonate, 1,2-pentene carbonate, 2,3-pentene carbonate and propylene carbonate. The preferred chain ethers have 4 to 8 carbon atoms. Examples of the chain ethers include dimethoxyethane, diethoxyethane, methoxyethoxyethane, dibutoxyethane, dimethoxypropane, diethoxypropane and methoxyethoxypropane. The preferred cyclic ethers have 3 to 8 carbon atoms. Examples of the cyclic ethers include tetrahydofuran, 2-methyl-tetrahydrofuran, 1,3-dioxolan, 1,2-dioxolan, 2-methyldioxolan and 4-methyl-dioxolan.

Suitable electrolyte salts include quaternary ammonium salts such as tetraethylammonium tetraflouroborate $((Et)_4NBF_4)$, hexasubstituted guanidinium salts such as disclosed in U.S. Pat. 5,726,856, the disclosure of which is incorporated herein by reference, and lithium salts such as disclosed by Ue et al., Mobility and Ionic Association of Lithium Salts in a Propylene Carbonate-Ethyl Carbonate Mixed Solvent, *Electrochem. Soc.*, vol. 142, No. 8, August 1995, the disclosure of which is incorporated herein by reference.

In a preferred embodiment, the electrodes 14, 16 in FIG. 1, are both carbon electrodes on the aluminum current collectors coated according to the present invention. The electrode can be fabricated by a forming process or by pressing electrode materials in a die and slurry pasting or screen printing carbon as a paste with a liquid phase binder/fluidizer. The liquid phase may be water or an electrolyte solvent with or without a thinner such as acetone. Both dry and wet electrode formations may include a binder such as polymers, starches, Teflon® particles or Teflon® dispersions in water.

The enclosing body 12 can be any known enclosure means commonly used with ultracapacitors. It is an advantage to minimize the weight of the packaging means to maximize the energy density of the ultracapacitor. Packaged ultracapacitors are typically expected to weigh 1.25 to 2 times more than the unpackaged ultracapacitor. The electrical leads 26 and 28 extend from the current collectors 22 and 24 through the enclosing body 12 and are adapted for connection with an electrical circuit (not shown). Ultracapacitor 10 of FIG. 1 includes a bipolar double layer cell 30 that includes two solid, nonporous current collectors 22, 24, two porous electrodes 14, 16 separating the current collectors 22, 24 and a porous separator 18 between the electrodes 14, 16 and an electrolyte 20 occupying pores in the electrodes 14, 16 and separator 18. Individual ultracapacitor cells can be stacked in series to increase operating voltage. The optimum design is to have adjacent cells separated with only a single current collector. This collector is nonporous so that no electrolytic solution is shared between cells. This type of design is called bipolar and is illustrated in FIG. 2 of the drawings. In a bipolar double layer capacitor, one side of the current collector contacts a positive electrode and the other side contacts a negative electrode of an adjacent cell. A series stack 40 of the high performance bipolar double layer cells 30 (A, B, C and D) is illustrated in FIG. 2. In FIG. 2, each pair of polarized carbon electrodes, 14, 16 is separated with a separator 18. A current collector 32 is attached at one surface to charged electrode 14 of a first cell. Attached to an opposite surface of the current collector 32, is an oppositely charged electrode 16 of a second cell. If one side of the current collector 32 is in contact with the negative electrode for a first capacitor cell "A," then the other side of the same current collector 32 is in contact with a positive electrode for an adjacent cell "B." A sufficient amount of an electrolyte 20 is introduced such that the electrolyte 20 saturates the electrodes 14 and 16 and separator 18 within each cell. Exterior current collectors 22 and 24 are placed at each end of the stack.

The internal current collectors 32 of the series stack of cells are preferably nonporous layers of aluminum foil designed to separate the electrolyte 20 between adjacent cells. The exterior current collectors are also nonporous such that they can be used as part of the external capacitor case seal, if necessary. The electronic separator 18 is located between the opposing carbon electrodes 14 and 16 within a particular capacitor cell. The electronic separator 18 allows ionic conduction via charged ions in the electrolyte.

The ultracapacitor cell can be constructed by placing the layers of conductor, electrode and separator along with electrolyte within an enclosing body. The structure can then be subjected to pressure to seal the layers within the enclosing body. Alternatively, the enclosing body can be subjected to pressure and vacuum. The vacuum acts to remove gases while the ultracapacitor is sealed. Alternatively, the ultracapacitor cell can be constructed by providing adhesive between layers and applying pressure and or heat throughout the adhesive to seal the cell.

Figure 3:
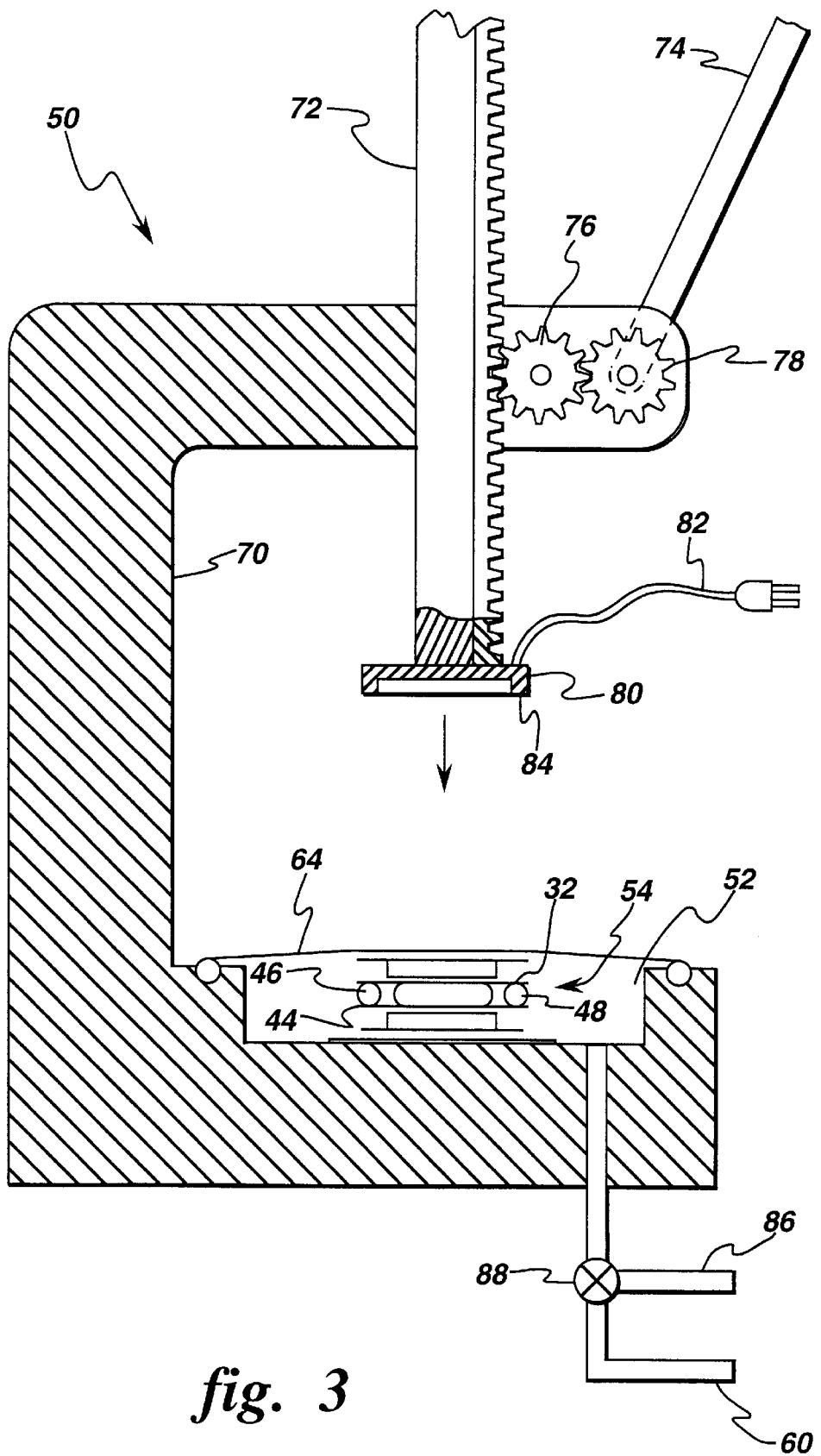
FIG. 3 is a cross-sectional view of an exemplary apparatus for sealing an ultracapacitor.

FIG. 3 depicts one, non-limiting illustration of an apparatus and method of sealing an ultracapacitor or series stack of ultracapacitor cells according to the present invention. Referring to FIG. 3, structure 50 is a frame, platform, or other construction but is often a press as described below. An enclosable region is depicted in FIG. 3 as recess 52, in which an ultracapacitor series stack 40 is disposed. The embodiment illustrated in FIG. 3 permits application of vacuum while the ultracapacitor is being sealed. Primary vacuum tube 60 communicates with recess 52. A collapsible membrane 64 can be fastened over the ultracapacitor to maintain a vacuum while the cell is being sealed by pressing.

Figure 4:
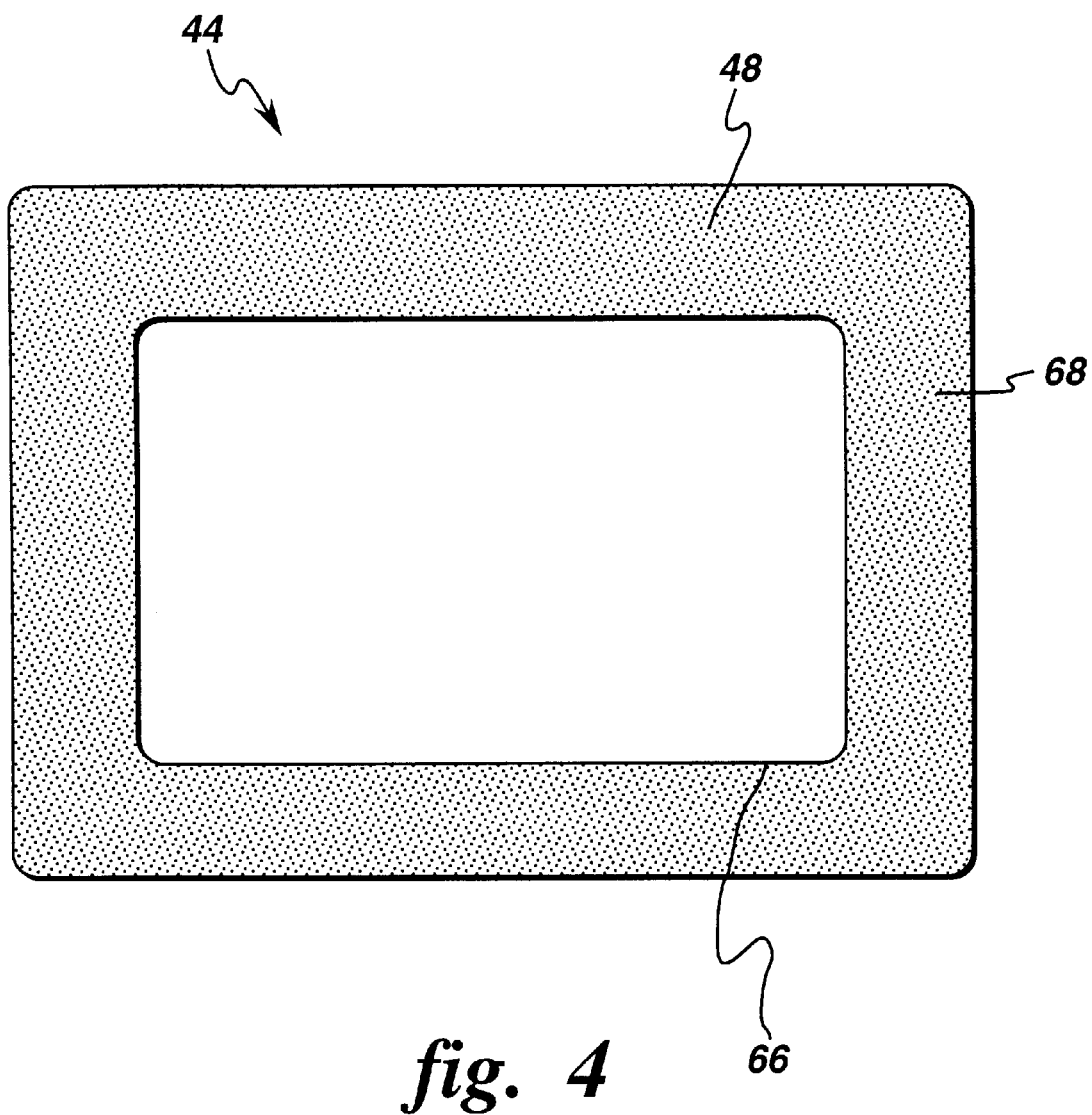
FIG. 4 is a top cross-sectional view of a separator of a sealed ultracapacitor.

FIG. 3 shows an ultracapacitor cell disposed in the recess area of the press 50. The cell includes a separator system, comprising an upper separator layer 42 and a lower separator layer 44. Sealant portions 46 and 48 are disposed in a peripheral area between the, bottom surface of separator 42 and the top surface of separator 44. "Peripheral" refers to the boundary area of the separator layers. In general, this area should be as small as possible. This boundary area is designated as element 68 in FIG. 4. FIG. 4 provides a top, cross-sectional view of a separator layer similar to layer 44 of FIG. 3, after sealant has spread to some extent by the action of pressure and, optionally, heat, as described below. The boundary area 68 surrounds the primary section 66 of a separator layer.

Many different types of sealants can be used in the present invention and the term is meant to encompass, "glues", or "pastes." Sealants are described, for example, in the *Kirk-Othmer Encyclopedia of Chemical Technology*, 3rd Edition, Vol.1, pp.488–508 (1978), and in *The Condensed Chemical Dictionary*, 10th Edition, 1981, Van Nostrand Reinhold Company. In general, the selected sealant should be chemically resistant to electrolyte. It should also be capable of withstanding operating temperatures of the ultracapacitor without substantial degradation. Moreover in those embodiments where the sealant contacts the separators, it should be capable of flowing through the thickness of the separator layers. Once cured, the sealant should be substantially impermeable to the flow or passage of electrolyte. Heat-curable sealants may be used in some embodiments. Moisture-cured sealants or externally-cured materials may be used. Other embodiments may use air-curable or pressure-sensitive sealants, such as "hot melt" glues. Illustrative sealants include those based on acrylic, ethylene such as ethylene vinyl acetate (EVA) copolymer, silicone, rubber, epoxy materials, or combinations of these materials. Commercial examples include the materials commonly referred to as "hot glues."

The sealants are usually in the form of liquids, pastes, or solids. A sealant may be applied to one or both of the facing surfaces of the separators or other surfaces. Many techniques are available for applying sealant. Known application techniques include the use of a spatula, brush, roller, spray, or glue gun. As one example, a bead, strip or "ring" of sealant is applied along the peripheral area 68 of one of the separator layers. Alternatively, individual droplets of sealant can be deposited at sites in the peripheral area 68 with the droplets flowing and covering the peripheral area 68 upon the application of pressure, vacuum and/or heat. As yet another alternative, at least one of the separator layers 18 can be pre-impregnated with sealant. All of these techniques cause the sealant to form a continuous layer. In general, the particular method of deposition is not critical, as long as the sealant is applied to locations where it will eventually form a seal after pressure or vacuum is released. The ultracapacitor becomes sealed by a barrier which is perpendicular to the horizontal capacitor layers which are encased in the barrier.

A compressive force is applied to promote the flow of the sealant—especially in the case of sealant compositions with very high softening points or glass transition temperatures, such as the EVA based types. Compression can be applied indirectly to the sealant through upper ultracapacitor layers by means of the mechanical press 50 of FIG. 3. Other devices to seal an ultracapacitor include an hydraulic press or pneumatic press or any device for applying compressive force. The press 50 of FIG. 3 includes structural frame 70 and adjustable beam 72. The length of beam 72 moves in a direction perpendicular to the base portion of the structural frame as controlled by the selective action of hand lever 74 and gears 76 and 78. Compression element 80 is detachably attached as the base of beam 72. Bottom surface 82 can be similar in shape to the peripheral area of the top planar surface of ultracapacitor 40. The force applied by the press should be sufficient to cause the sealant to become substantially fluid, to flow and form a continuous bead or strip around the peripheral area of the layer on which it is deposited. Thus, the particular press force depends in large part on the nature of the sealant. In general, the pressure will be in the range of about 1 psi to about 1,000 psi and preferably, in the range of about 10 psi to about 100 psi. A lower press force will be suitable for lower viscosity sealants and a higher press force will be required for higher viscosity materials.

The sealant can be heated while being compressed. Heating enhances the flow characteristics of the sealant. Heating temperature should be sufficient to soften the sealant. Preferably, the temperature is high enough to melt the sealant. For a sealant made from an EVA based material, a suitable temperature will be in the range of about 100° C. to about 300° C.

Heat is applied to the sealant in the press 50 of FIG. 3 by means of a standard electrical heating element that is encased within element 80 and is connected to an electrical outlet by way of cord 82. The bottom surface 84 of element 80 has a shape that aligns with sealant-containing peripheral regions of ultracapacitor 10. Thus, when compression element 80 is lowered for compression of the ultracapacitor through membrane 64, heat is transmitted primarily to the sealant containing regions.

A vacuum can be applied to press together the layers of the ultracapacitor and to evacuate ambient gasses from the internal region of the cell structure. In FIG. 3, vacuum tube 60 is connected to a vacuum source through vacuum valve 88 with backfill vacuum tube 86. When vacuum is applied, the collapsible membrane 64 is positioned over recess 52. The membrane 64 maintains the vacuum within the recess and transmits the applied compressive force to the layers of the ultracapacitor. The membrane 64 is heat-resistant to a temperature of about 400° C. The amount of vacuum applied ranges from about 700 mm mercury to 0.1 mm mercury. A typical vacuum pressure is in the range of about 500 mm mercury to about 0.1 mm mercury.

In operation, the applied vacuum pressure draws collapsible membrane 64 tightly against the top of ultracapacitor 10, compressing the individual layers of the ultracapacitor against platform layer 58 while the action of compression element 80 presses against sealant-containing regions to induce sealant 46, 48 to permeate the peripheral regions of separator layers 18. The sealant contacts substantially aligned peripheral areas 60 of the facing surfaces of conductive layers 22 and 24. As the sealant cures or solidifies, it forms a strong bond to join layers 22 and 24. After sealing is complete, compression element 80 is retracted and the ultracapacitor is allowed to cool.

The following Examples are illustrative of the invention.

EXAMPLES

The following Examples show that ultracapacitor cells fabricated with TiN coated aluminum foil show less resistance at manufacture and less resistance increase in use than cells fabricated with bare aluminum foil. In the Examples, cells were made with a variety of reactively sputter-deposited TiN coatings on household Reynolds Wrap® aluminum foil and compared via measurements at 1 kHz AC resistance. Cells with and without TiN coating on aluminum current collectors were fabricated by screen printing carbon electrodes onto the current collector sheet, adding 1 M tetraethylammonium tetrafluoroborate in -butyrolactone electrolyte and compressing the electrodes between plastic coated steel plates in a hydraulic press. Two electrodes, with a porous cellulosic separator interposed, were sealed by placing thin precut strips of adhesive on the bare perimeter of the current collector and heating to about 180° C. with 50 PSI applied for 15–30 seconds. The entire cell structure was sealed while under a vacuum of 2–10 millimeters of mercury.

Cells were electrically tested while under 20–40 PSI pressure, applied to the active area only, by compression in a hydraulic press. The AC measurement of resistance was done at 1 kHz with a Hewlett-Packard 4262A LCR meter. Results (1 kHz AC resistance) for two runs, designated A and B, are reported in the following Table I. In Table I, run A was taken at the time of cell fabrication and run B was taken 23 days later.

TABLE I

| Cell No. | Cell Size | Description | A | B |
|---|---|---|---|---|
| W062496G | 5" × 5" | Reynolds Wrap ® HD | 0.195 | 0.260 |
| W062496H | 5" × 5" | TiN/Al single 0.05μ layer | 0.158 | 0.150 |
| W062596A | 2" × 2" | Reynolds Wrap ® HD | .20 | 1.16 |
| W062596B | 2" × 2" | Reynolds Wrap ® HD | 1.34 | 1.13 |
| W062596D | 2" × 2" | TiN/Al single 0.05μ layer | 0.66 | 42.0* * |
| W062596E | 2" × 2" | TiN/Al single 0.05μ layer, no etch | 0.393 | 0.289 |
| W062596F | 2" × 2" | TiN/Al single 0.015μ layer | 0.570 | 12.0* * |
| W062596G | 2" × 2" | TiN/Al single 0.005μ layer | 0.884 | 0.540 |

TABLE I-continued

| Cell No. | Cell Size | Description | A | B |
|---|---|---|---|---|
| W062596H | 2" × 2" | $Ti_x N_{1-x}$*/Al single 0.05μ layer | 1.80 | xxx** |
| W062596I | 2" × 2" | Ti/Al double 0.05μ layer | 0.391 | 0.294 |

*x was <1 and >0.5 (less than stoichiometric N)
**Pinhole corrosion was evident and corrosion resulted Of the six variations in TiN coating procedures tested, two showed very low contact resistance to aluminum. They were W062596E and W0625961.

In an attempt to increase contact between the TiN and aluminum by removal of the native aluminum oxide layer, the aluminum foil was sputter-etched before deposition. The sputter-etched foils were used in cells W062596A-H. However, sputter-etching was observed to have an opposite to the intended effect. Cells W062596D and W062596E were identical cells with and without the sputter-etching of the aluminum collectors. Cell W062596E without etching, showed markedly lower resistance. Pinholes in sputtered coatings are almost exclusively due to dust and contaminant particles. Cell W0625961 compared to cell W062596D shows a benefit of applying a TiN coating in two steps with a cleaning step between to remove or rearrange dust particles.

W062596F and W062596G were cells made with less than 500 Angstroms (0.05 m) of TiN coating. These cells showed less resistance reduction compared with cells made with 500 Angstroms TiN coatings.

The W062596H, made with a less than stoichiometric nitrogen TiN coating, showed high contact resistance and no benefit over bare aluminum.

Another comparison was conducted between aluminum foil current collectors and TiN coated aluminum foil. Results (1 kHz AC resistance ) for run A, are reported in the following Table II.

TABLE II

| Cell No. | Cell Size | Description | A |
|---|---|---|---|
| W093096B | 5" × 5" | Reynolds Wrap ® HD | ~0.100 |
| W093096C | 5" × 5" | Reynolds Wrap ® HD | ~0.103* |
| W093096D | 5" × 5" | TiN/Al, double 0.025μ layers | 0.047 |
| W093096E | 4.5" × 4.5" | Reynolds Wrap ® HD | ~0.155* |
| W093096F | 4.5" × 4.5" | Reynolds Wrap ® HD | ~0.899* |
| W093096G | 4.5" × 4.5" | TiN/Al, double 0.025μ layers | 0.065 |
| W093096H | 5" × 5" | TiN/Al, double 0.025μ layers | 0.048 |
| W093096I | 5" × 5" | TiN/Al, double 0.025μ layers | 0.046 |
| W093096J | 5" × 5" | TiN/Al, double 0.025μ layers | 0.050 |

*AC resistance on aluminum cells increased during a measurement period of 10–20 seconds.

The data shown in Table II establish the decreased resistance of cells fabricated with TiN coated aluminum foil. In addition, resistance values were stable (not rising) when measured, which indicate the oxide layer on the aluminum surface was not growing. Stability is also shown in the reproducible resistance values of TiN coated aluminum cells versus cells with uncoated aluminum current collectors.

What is claimed is:

1. An ultracapacitor comprising at least one cell, said cell comprising:

two solid, nonporous current collectors comprising a conductive metal substrate coated with a metal nitride, carbide or boride coating, two porous electrodes separating said current collectors, a porous separator between said electrodes and an electrolyte occupying pores in said electrodes and separator.

2. The ultracapacitor of claim 1, wherein said conductive metal substrate is aluminum, copper or steel.

3. The ultracapacitor of claim 1, wherein said conductive metal substrate is coated with a nitride, carbide or boride of a refractory metal.

4. The ultracapacitor of claim 1, wherein said conductive metal substrate is coated with a stoichiometric proportioned metal nitride.

5. The ultracapacitor of claim 1, wherein said conductive metal substrate is coated with titanium nitride.

6. The ultracapacitor of claim 1, wherein said current collectors comprise an aluminum substrate coated with titanium nitride.

7. A stack of ultracapacitor cells, comprising at least one of the cells of claim 6.

8. The ultracapacitor of claim 1, wherein said electrodes comprise carbon.

9. A stack of ultracapacitor cells, comprising at least one of the cells of claim 8.

10. The ultracapacitor of claim 1, wherein said separator is polypropylene or cellulosic tissue material.

11. A stack of ultracapacitor cells, comprising at least one of the cells of claim 10.

12. The ultracapacitor of claim 1, wherein said electrolyte is a nonaqueous electrolyte.

13. The ultracapacitor of claim 1, wherein said electrolyte comprises a polar aprotic organic solvent and a quaternary ammonium salt, a hexasubstituted guanidium salt or a lithium salt.

14. The ultracapacitor of claim 1, wherein said electrolyte comprises γ-butyrolactone and tetraethylammonium tetraflouroborate.

15. A stack of ultracapacitor cells, comprising at least one of the cells of claim 14.

16. The ultracapacitor of claim 1, comprising a plurality of electrodes separating said current collectors.

17. A stack of ultracapacitor cells, comprising at least one of the cells of claim 1.

* * * * *